March 29, 1949. A. PEET 2,465,697
GAS-FIRED WATER HEATER
Filed Sept. 28, 1944 9 Sheets—Sheet 1

Inventor
Alexander Peet
By
Williams, Bradbury & Hinkle
Attorneys

March 29, 1949.  A. PEET  2,465,697
GAS-FIRED WATER HEATER
Filed Sept. 28, 1944  9 Sheets-Sheet 3

Alexander Peet Inventor
By
Williams, Bradbury & Hinkle
Attorneys

March 29, 1949.　　　　A. PEET　　　　2,465,697
GAS-FIRED WATER HEATER

Filed Sept. 28, 1944　　　　　　　　　　9 Sheets-Sheet 4

Inventor
Alexander Peet
By
Williams, Bradbury & Hinkle
Attorneys

March 29, 1949.  A. PEET  2,465,697
GAS-FIRED WATER HEATER
Filed Sept. 28, 1944  9 Sheets-Sheet 5

Inventor
Alexander Peet
By
Williams, Bradbury & Hinkle
Attorneys.

March 29, 1949. A. PEET 2,465,697
GAS-FIRED WATER HEATER
Filed Sept. 28, 1944 9 Sheets-Sheet 6

Inventor
Alexander Peet.
By
Williams, Bradbury & Hinkle
Attorneys

March 29, 1949.   A. PEET   2,465,697
GAS-FIRED WATER HEATER
Filed Sept. 28, 1944   9 Sheets-Sheet 7

Inventor
Alexander Peet
By
Williams, Bradbury & Hinkle
Attorneys

March 29, 1949. A. PEET 2,465,697
GAS-FIRED WATER HEATER
Filed Sept. 28, 1944 9 Sheets-Sheet 9
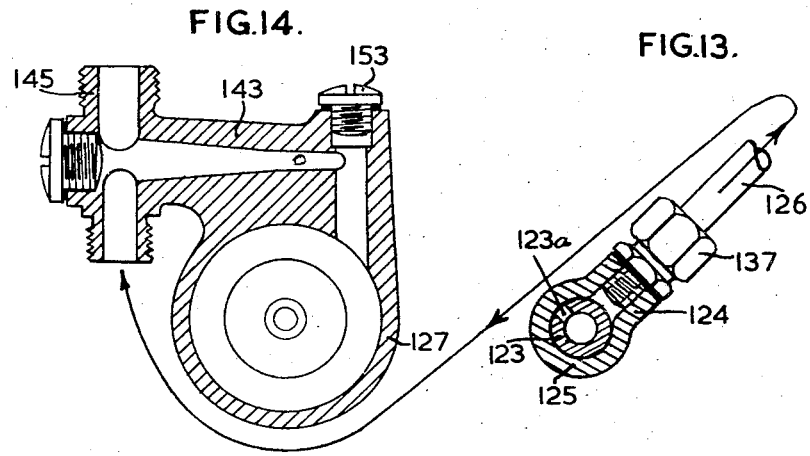
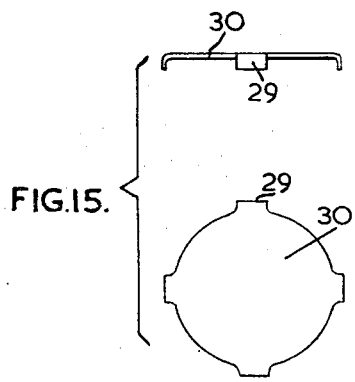
Inventor:
Alexander Peet
By Hinkle, Horton, Ahlberg, Hansmann & Kupper
Attorneys.

Patented Mar. 29, 1949

2,465,697

UNITED STATES PATENT OFFICE 2,465,697

GAS-FIRED WATER HEATER

Alexander Peet, Luton, England

Application September 28, 1944, Serial No. 556,203
In Great Britain October 23, 1943

5 Claims. (Cl. 236—25)

This invention has reference to gas-fired water heating apparatus adapted to give a rapid or almost instantaneous hot water supply and of the kind in which a self-closing gas valve regulates the gas supply to the burner and is automatically opened by pressure created by the flow of water through the water heating system.

According to my invention the automatic gas valve is controlled by a piston or other pressure-responsive member which is responsive to water pressure generated in a chamber interposed between the water inlet to the heater and the water heating system, the water pressure being generated in the chamber only when water flows through the heating system.

The required water pressure in the chamber is preferably created by restricting the water flow from the chamber to the water heating system. This may be attained by the provision of a restricted orifice or constriction between the chamber and the heating system. The restriction should be of such an area that, together with the fluid friction losses through the remainder of the apparatus, the pressure created in the piston chamber will actuate the piston or other pressure-responsive member to open the gas valve when the water is turned on.

The gas valve is controlled by differential water pressure on opposite sides of a piston, diaphragm, or other pressure-responsive member in a chamber which is located at the inlet side of the water heating system, and the water control valve or outlet tap is preferably located at the outlet side of the said water heating system, the arrangement being such that, when the water outlet tap is closed, the pressures on opposite sides of the pressure-responsive member balance each other and permit the gas valve to close under the action of a closing spring (or by gravity), and when the water outlet tap is opened, a pressure difference is created on opposite sides of the pressure-responsive member, causing the gas valve to open. If the water tap is fitted at the outlet side of the water heating system, there is little or no possibility of the water dripping when the tap is closed. Moreover, the water heating system remains completely filled with water at the normal mains pressure.

The present invention further consists in the provision of a readily removable automatic gas valve controlling unit comprising a differential pressure chamber and piston or other pressure-responsive member, enabling the gas valve controlling unit to be replaced by one having a larger or smaller piston or pressure-responsive member to suit the water supply pressure at the place of installation of the heater.

My invention also includes means for creating the pressure difference on opposite sides of the piston or other pressure-responsive member comprising a Venturi tube connecting the space at one side of the said member with the inlet end of the water heating system, the space at the other side of the said member communicating with the throat of the Venturi tube where a reduced pressure occurs during the water flow.

The automatic gas valve controlling unit may also include a water pressure regulator or governor for regulating the flow of water into the water pressure chamber according to changes in the pressure and water flow, thus controlling the movement of the pressure-responsive member and regulating the degree of opening of the automatic gas valve. The water pressure regulator or governor may comprise an apertured disc through which the water flows to one side of the pressure-responsive member, the rate of water flow through the disc being controlled by a throttle valve movable with the pressure-responsive member.

The water heating system may comprise a circuitous water heating pipe or coil enclosed in a heater casing surrounding a gas burner of any suitable type which preferably includes a thermostatically-controlled safety pilot light.

The gas-fired water heater of the present invention is of compact design and is preferably constructed and arranged to enable the gas and water sections to be readily dissembled for cleaning, examination or repair.

In order that the invention may be more clearly understood, reference is hereinafter made to the accompanying explanatory drawings whereon:

Fig. 13 is a fragmentary section on line 13—13 of Fig. 8.

Fig. 14 is a view taken in section on line 14—14 of Fig. 9 showing the Venturi structure.

Fig. 15 shows in side and plan view the governor diaphragm 30 shown in Fig. 2.

Figure 11:
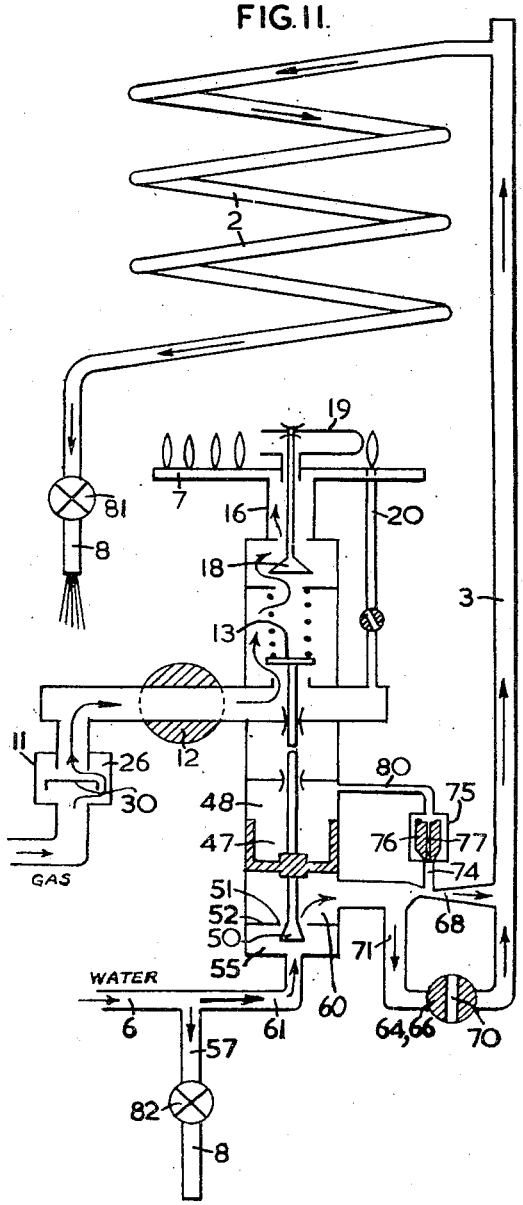
Fig. 11 is a diagrammatic illustration of the gas and water passages of the heater shown in Fig. 2.
Figure 12:
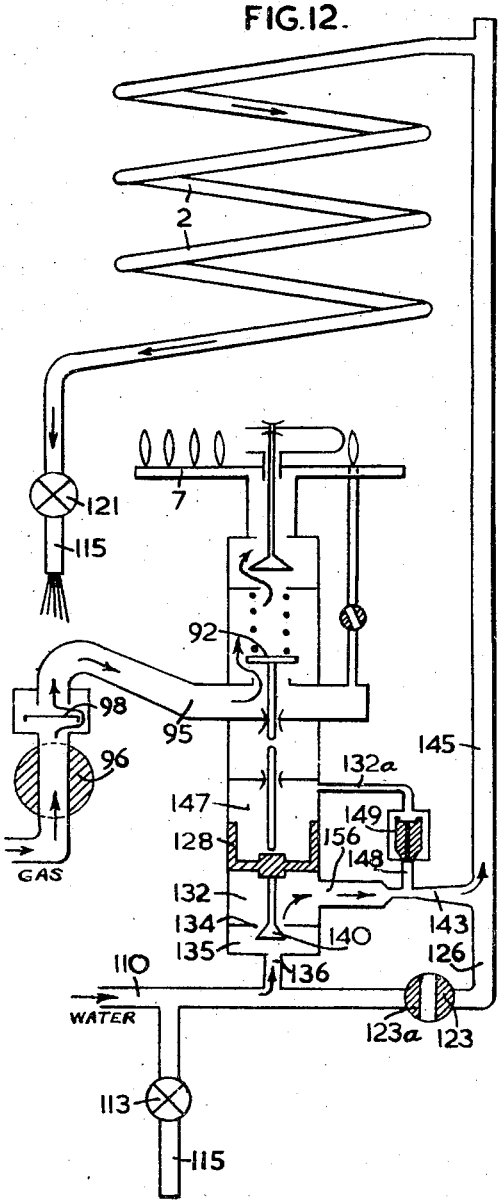
Fig. 12 is a similar diagrammatic representation of the gas and water passages of the heater shown in Fig. 9. The arrows show the direction of flow of the gas and water.

The heater shown in Figs. 1–6 and diagrammatically in Fig. 11 comprises an outer casing 1 enclosing a coiled water heating pipe 2 connected at its ends to branches 3 and 4 extending from a casting 5 hereinafter called the "water section." Water is supplied to the heater through a supply pipe 6 and after passing through the water section 5 and through the branch 3 is heated in the pipe coil 2 by the products of combustion from a gas burner 7. The water heated in the pipe coil 2 passes by way of the branch 4 into the water section 5 and is finally discharged through an outlet spout 8.

The gas is supplied to the burner by a gas supply pipe 9 which is coupled to an elbow 10. The gas after passing through a governor 11 is controlled by a manually-operated gas valve 12 before reaching an automatic gas valve 13 contained in a casting 14 hereinafter called the "gas section." The automatic gas valve 13 is normally pressed down on to its valve seat by a spring 15. When the valve 13 is automatically lifted by water pressure, as hereinafter described, gas rises into a tube 16 which is coupled to a central tubular vertical extension 17 of the gas section 14. The tube 16 forms a support for the burner 7 and houses a safety valve 18 which is controlled in known manner by a bent bimetallic strip 19 which is under the influence of a pilot jet 20 to which gas is constantly supplied by way of a pilot jet tube 21 except when the gas valve 12 is moved to completely cut off the gas supply. One end of the bimetallic strip 19 is fixed to a central boss 22 on the burner 7 and the other end is forked to engage between a pair of collars 23 on the spindle 24 of the safety valve 18. Should the gas supply fail for any reason, causing the pilot jet 20 to be extinguished, the bimetallic strip 19 opens out and lifts the spindle 24, in known manner, thus closing the safety valve 18 on to a valve seat 25 and cutting off the supply of gas to the burner.

Figure 2:
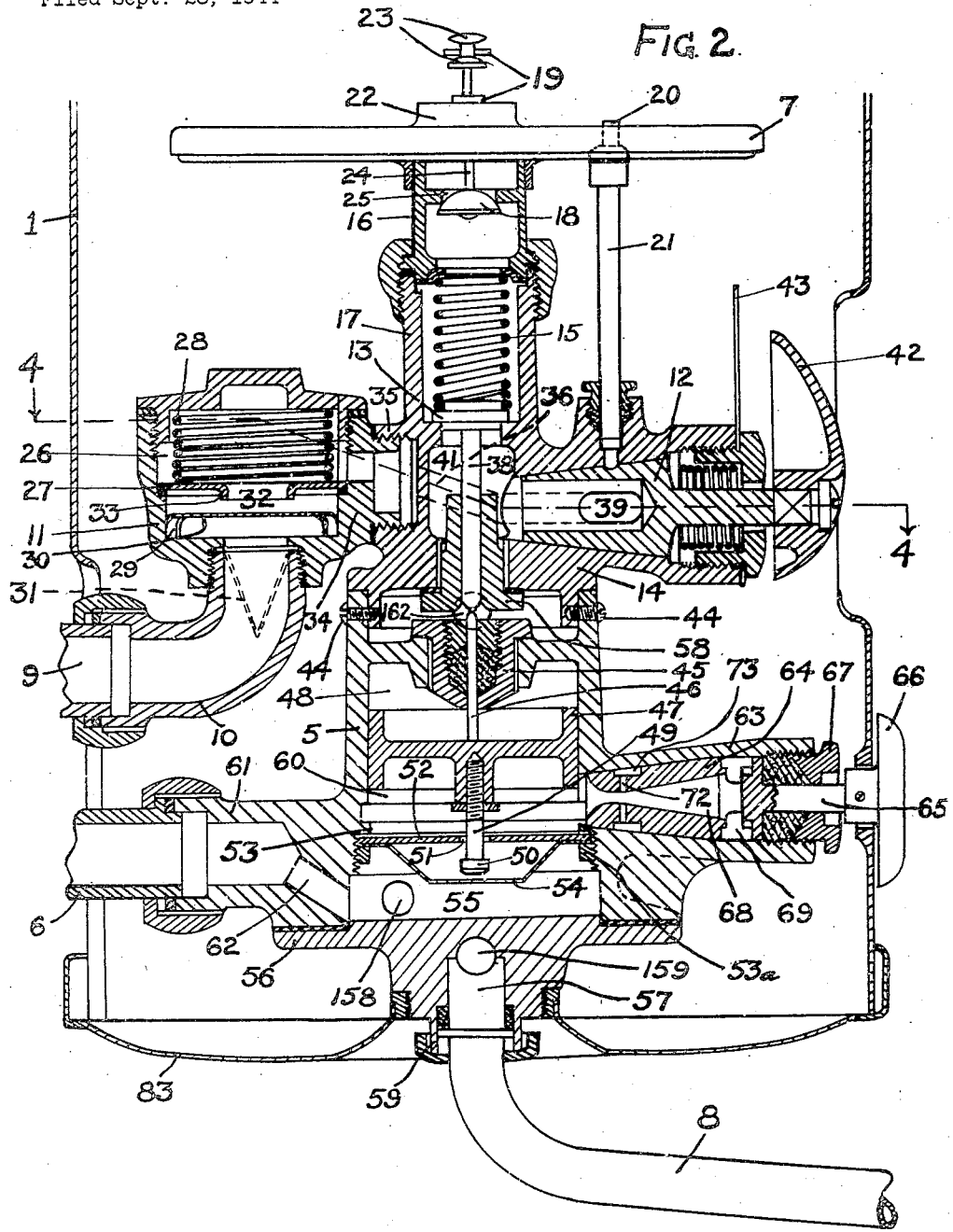
Fig. 2 is a sectional elevation through the gas and water sections.
Figure 3:
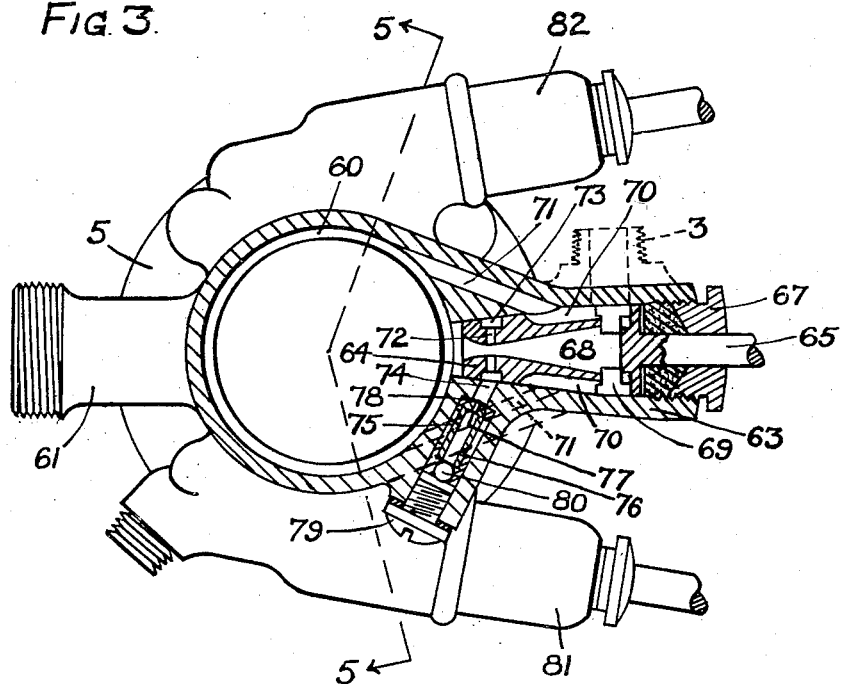
Fig. 3 is a sectional plan view taken substantially on the zig-zag line 3—3 in Fig. 1.
Figure 4:
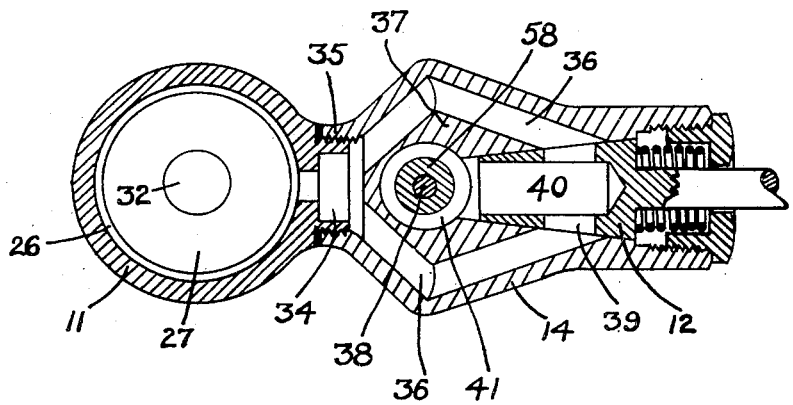
Fig. 4 is a sectional view on the zig-zag line 4—4 in Fig. 2.
Figure 5:
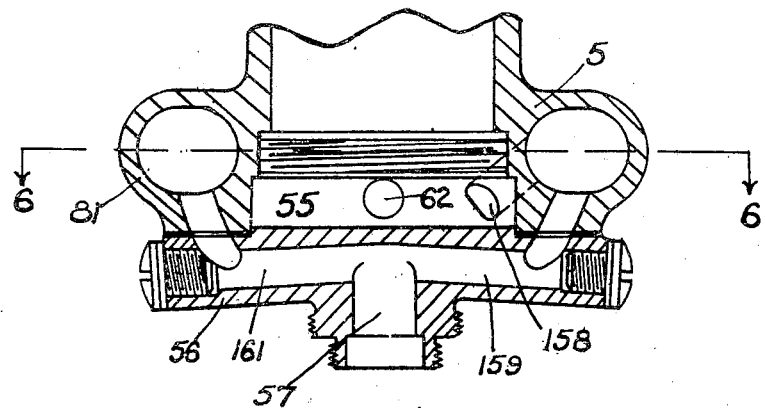
Fig. 5 is a fragmentary sectional view on the bent line 5—5 in Figs. 3 and 6.
Figure 6:
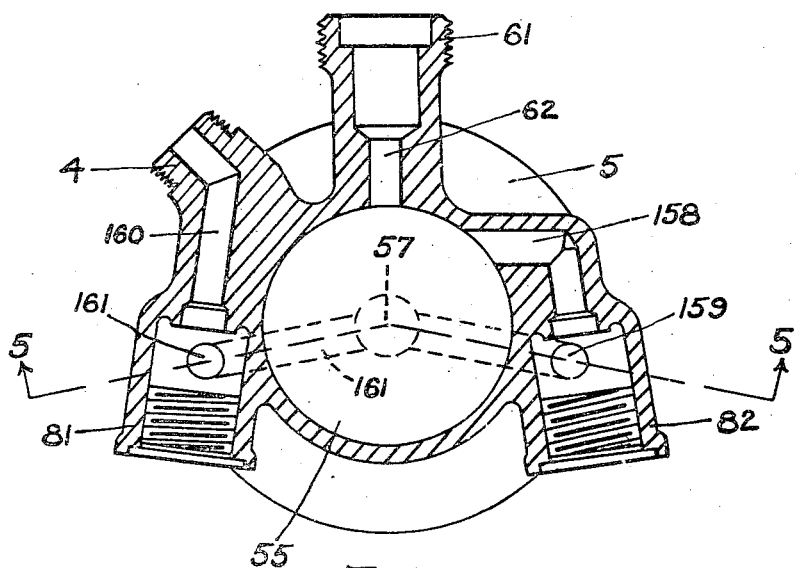
Fig. 6 is a cross-sectional view of the casting only, taken on the line 6—6 of Fig. 5.
Figure 7:
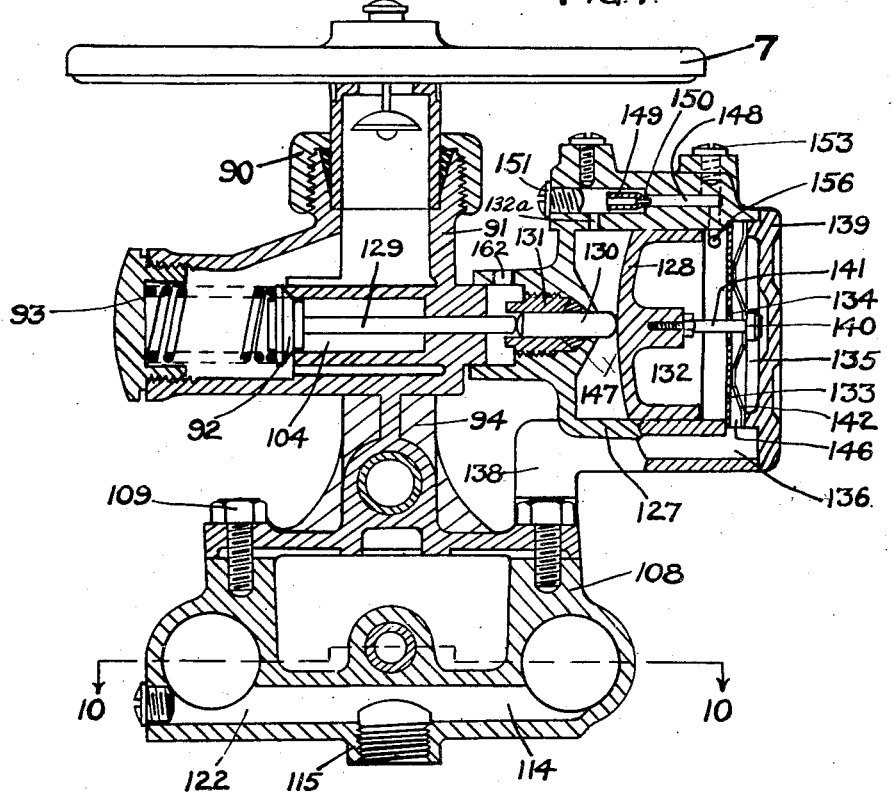
Fig. 7 is a sectional elevation showing a modified construction of the gas and water sections, the section being taken on the line 7—7 in Fig. 9.
Figure 10:
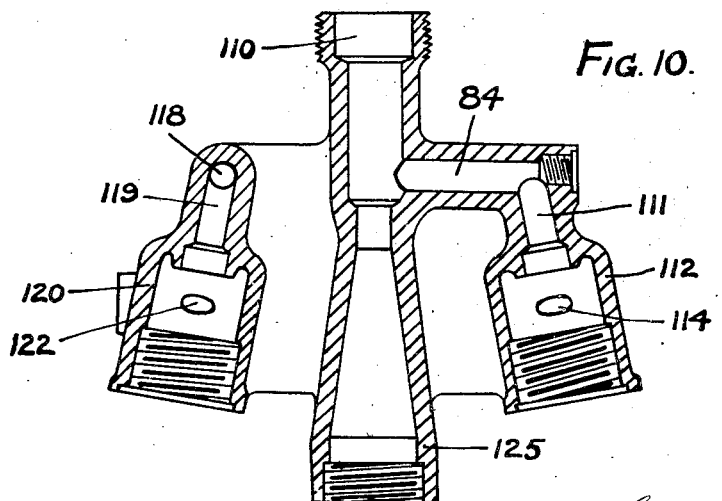
Fig. 10 (sheet 5) is a cross-sectional view taken on the line 10—10 in Fig. 7 showing the casting only.
Figure 8:
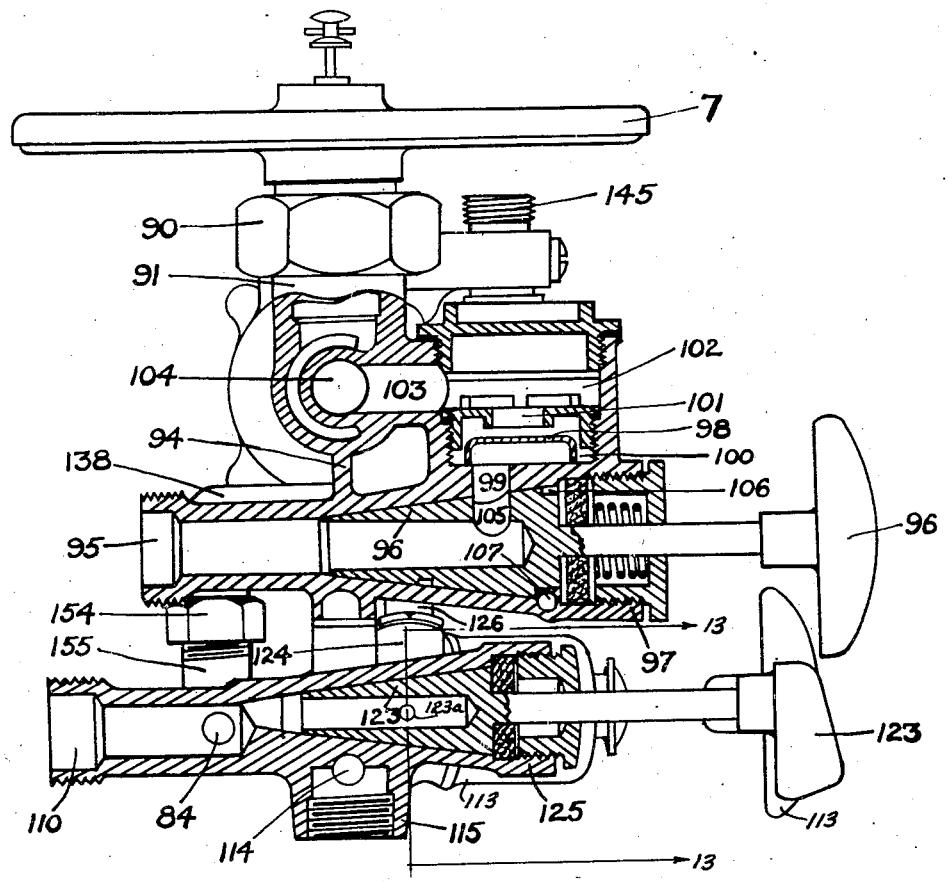
Fig. 8 is a sectional view on the line 8—8 in 9.
Figure 9:
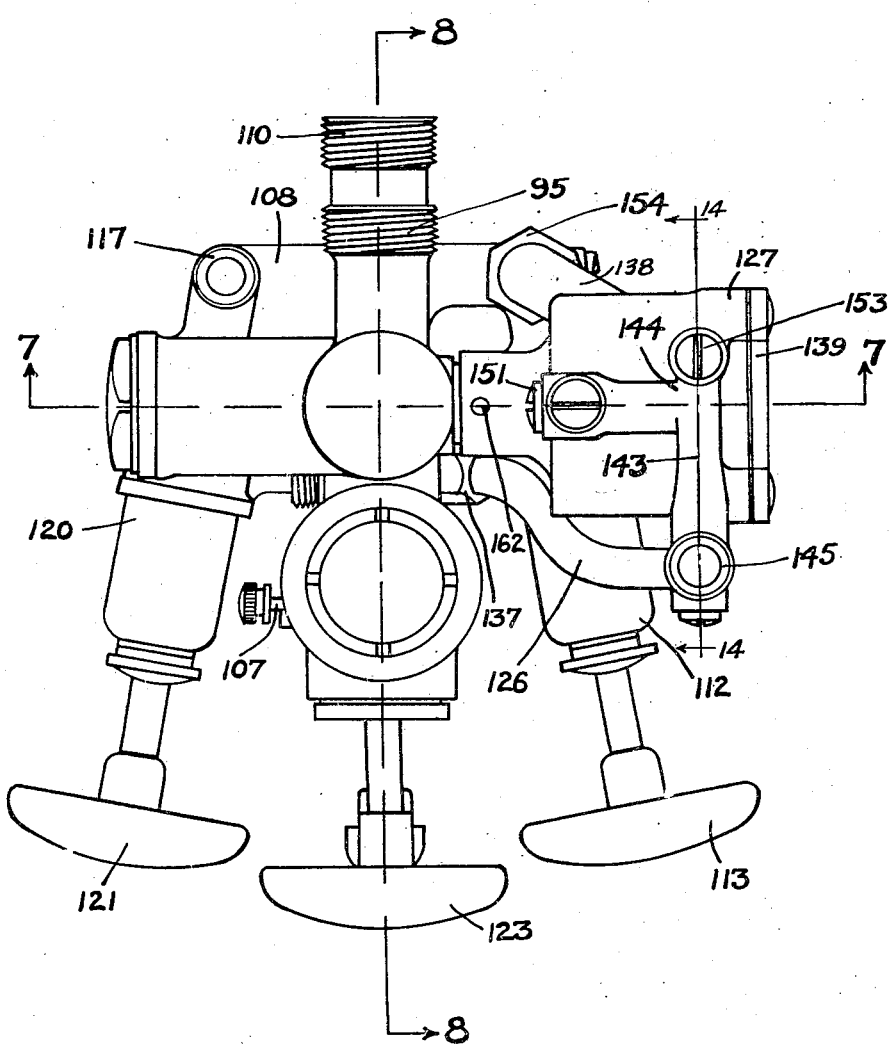
Fig. 9 is a plan view of the construction shown in Figs. 7 and 8, but with the burner removed.

On reference to Figs. 2 and 4, it will be seen that the gas governor 11 comprises a chamber 26 in which is a horizontal diaphragm 27 held in position on an internal shoulder by a spring 28. Below the diaphragm 27 and loosely resting by legs 29 on the base of the chamber 26 is a light diaphragm 30 of smaller diameter than the chamber 26, see also Fig. 15. When gas enters through the elbow 10, it passes through a filter 31 and around the edges of diaphragm 30 and through a central port 32 in the spring-pressed diaphragm 27. A depending flange 33 around the port 32 serves to limit upward movement of diaphragm 30 and to prevent gas passing through port 32 in the event of a sudden inrush of gas.

An outlet branch 34 on the governor chamber 26 has screw-threaded connection with a gas inlet branch 35 in the gas section 14. Passages 36 are formed in the casting 14, these passages being cored or drilled out (as seen in Fig. 4) on both sides of a central portion 37 through which passes the stem 38 of the automatic valve 13. The passages 36 connect the inlet branch 35 to lateral ports 39 in the main gas valve 12 which has an axial passage 40 connecting the ports 39 to a chamber 41 formed in the centre of the gas section, communication between the chamber 41 and the burner supporting tube 16 being controlled by the automatic valve 13. As shown, the main gas valve 12 is of the rotary conical plug type and is fitted with an operating handle 42 movable over an indicator dial 43.

The heater shown in Figs. 1 to 6 has the gas burner 7 detachably mounted by means of studs 44 upon the gas section 14 which is detachably surmounted upon the water section 5. The automatic gas supply valve 13 to the burner is centrally and vertically disposed in the gas section above a vertically movable controlling piston 47 in the water section. The gas section 14 may be removed without disturbing the water section 5, it being understood of course that the gas supply main must be uncoupled from the gas section to enable the latter to be removed.

The gas tap is arranged horizontally in the gas section at the front thereof, the gas passing from the governor 11 at the back of the gas section to the gas tap 12 through the passages 36 formed in the gas section around the vertically and centrally disposed automatic gas valve 13. The gas from the main supply pipe passes through the governor 11 detachably fitted to the back of the gas section 14.

At the underside of the gas section 14 is a valve guide 58. The water section 5 is fitted in its upper part with a stuffing gland 45 for a spindle 46, the upper end of which touches the lower end of valve stem 38 and the lower end of which rests on the piston 47 movable in a piston chamber 48. Screw-threaded into or otherwise attached to the underside of the piston 47 is the stem 49 of a governor valve 50. The stem 49 passes through a central port 51 in a diaphragm 52 which is pressed upwards against an internal shoulder 53 by a screw-threaded ring 53a, a filter 54 being interposed between diaphragm 52 and ring 53a located in a space 55 in the lower part of the water section. The governor valve 50 controls the flow of water through the port 51. The underside of the water section is closed by a detachable cover 56 having an outlet passage 57 which communicates with the outlet spout 8 swivel-mounted in the stuffing gland 59.

Water from the main supply pipe 6, which is coupled to an inlet branch 61 on the water section, flows through a passage 62 into the space 55 and passing through the port 51 in diaphragm 52 enters a space 60 at the underside of piston 47. Rotatable in a lateral extension 63 of the casting 5 is a water control tap comprising a tapered plug 64 rotated by the spindle 65 of a knob 66. The spindle 65 passes through a stuffing gland 67 and the plug 64 has a double conical axial passage through it which forms a Venturi passage 68 connecting the space 60 with an annular space 69 at the outer end of plug 64. Space 69 communicates with the outer end of a longitudinal groove 70 cut in the side of plug 64, and the inner end of groove 70 communicates by way of a passage 71 in casting 5 with the space 60.

Passage 71 and groove 70 form a passage which bye-passes Venturi passage 68. The annular space 69 also communicates with outlet branch 3 to heater pipe 2. It will be apparent therefore that water from space 60 beneath piston 47 can flow to the heater pipe 2 either through Venturi passage 68 or bye-pass passages 71, 70. In the region of the throat of the Venturi passage, radial holes 72 in the plug 64 communicate with an annular groove 73 around the plug. Annular groove 73 communicates with a lateral passage 74 which opens out into a chamber 75 in which is fitted a hollow check valve 76 which is axially and easily movable in chamber 75. One end of valve 76 has a small central bore 77 and is adapted to seat in a seating ring 78. The outer end of chamber 75 is sealed by a plug 79 and a vertical passage 80 connects chamber 75 with the space 48 above piston 47.

The piston is preferably made of a hard rubber compound or of a metallic or non-metallic or composite material which will work freely in the piston chamber at any water temperature.

The controlling piston 47 is subjected to differential pressure on opposite sides thereof to control the opening of the gas valve 13 during flow of water through the heater, and the arrangement is such that by removal of the bottom cap or cover 56, which includes the water discharge passage 8, access may be had to the piston 47 without removing the gas or water sections.

The water tap 64 having the control knob 66 acts as a water temperature selector tap and is arranged horizontally on the water section 5 at the front thereof, this water tap incorporating the Venturi passage 68, one end of which communicates with the chamber 60 in which the piston 47 is vertically movable, said chamber 60 being in communication with the water inlet 61, and the throat of the Venturi passage being in communication with the space 48 above said piston, thereby to create a reduced pressure above the piston 47 when water flows through the Venturi passage 68, which delivers the water through the outlet branch 3 in the top casing to the water heater pipe or coil 2. Temperature control of the water is attained by the provision of the bye-pass passage 70, 71 between the outlet port from said selector tap and the lower part 60 of the piston chamber, the flow through said bye-pass passage 70, 71 being regulated by adjustment of said selector tap, to regulate the flow of water through the heater pipe or coil 2.

The gas tap and water temperature selector tap, as shown, are preferably in the form of rotary plug taps working in barrels forming lateral extensions of the gas and water sections respectively. This arrangement permits of removal of the plug taps for inspection and cleaning, without disturbing the gas and water sections. Moreover, as the Venturi passage is formed in the plug of the water tap 64, removal of the latter withdraws the Venturi passage for inspection and cleaning if necessary.

The axially-movable check valve 76 is adapted to seat itself and restrict communication between the Venturi passage 68 and the upper part 48 of the piston chamber when water flows through the system, thus retarding upward movement of the piston 47 and consequent opening of the automatic gas valve 13. The aforesaid check valve 76 is unseated by expulsion of water from the upper part 48 of the piston chamber when the automatic gas valve 13 closes under the action of its closing spring 15 (or by gravity), thus rapidly establishes equilibrium on opposite sides of the piston 48 and quick closing of the automatic gas valve 13 when water ceases to flow through the heater. One or more holes 162 (Fig. 2) are provided in the castings 5 and 14 where they meet, in order that water or gas leaking into the space between the two castings can escape. The water flow is controlled by the provision of an outflow tap 81 between the outflow end of the heater pipe or coil and the discharge spout 8 which is swivel-mounted on the bottom cap or cover 56 of the water section. A cold water supply tap 82 is preferably also provided for supplying cold water direct to the discharge spout 8 from the water inlet main 6, when required.

A water pressure governor is preferably combined with the gas valve controlling piston 47. For this purpose the ingress of water into the space 60 beneath the said piston and from thence through the Venturi passage 68 or bye-pass passage 70, 71 to the heater pipe or coil is governed by passage through the central port 51 in the diaphragm 52 which closes the underside of the piston chamber 60, the port 51 being controlled by the throttle valve 50 carried at the end of the stem 49 attached to the piston 47, so that lifting of the piston 47 throttles the flow of water through the diaphragm 52.

Access to the gas and water sections of the heater is afforded by the provision of a removable bottom cover 83 fitted to the base of the outer shell or casing.

Figure 1:
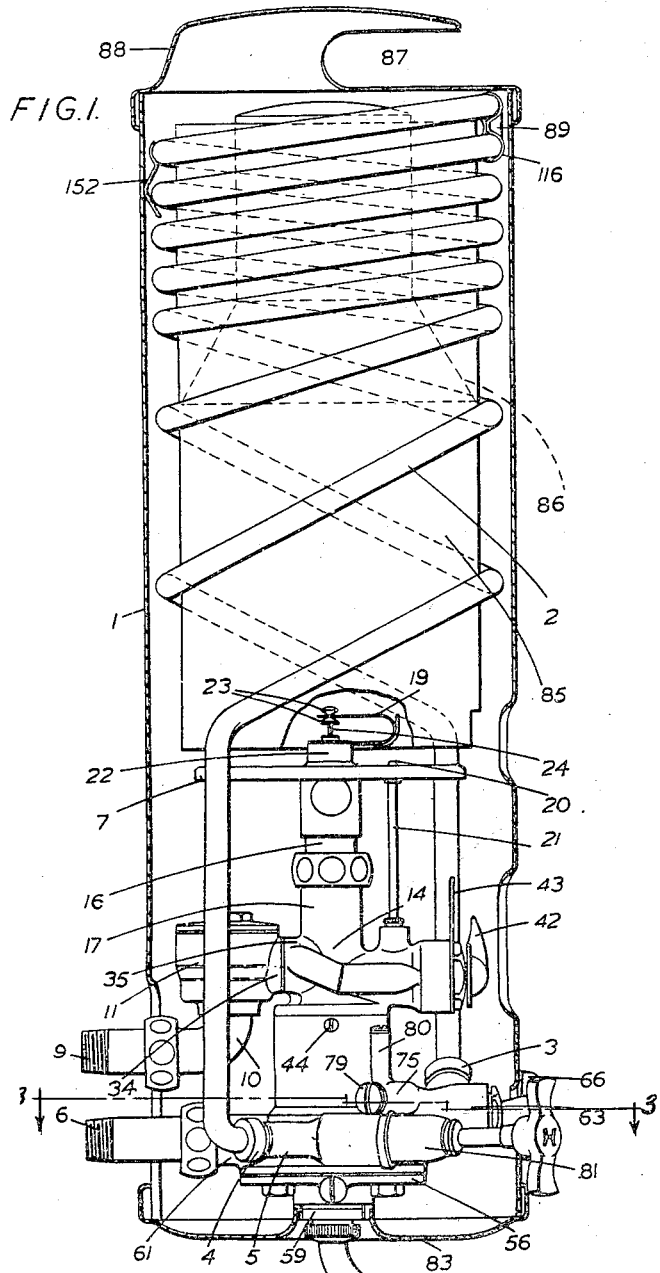
Fig. 1 is a view of the heater showing the casing in section and showing the interior construction in side elevation.

As shown in Fig. 1, the heating pipe 2 is coiled around an inner metallic shell 85 fitted in its upper portion with a finned heat exchanger 86 from which the products of combustion discharge through an opening 87 in a cover 88. The pipe coil 2 is preferably made in two lengths brazed at 89 to a return bend and held apart by a metal clip 116. Spring clips 152, one of which is shown in Fig. 1, serve to position the pipe coil 2 and inner shell 85 within the outer casing 1.

When only cold water is required, the cold water tap 82 is opened and cold water flows from cold water inlet connection 61 into space 55 and through a passage 158 into the casing of the tap 82 and from thence through a radial passage 159 in cover 56 to main outlet 57.

When hot water is required, hot water tap 81 is opened and hot water from the heating pipe coil 2 flows through return connection 4 and a passage 160 to the casing of hot water tap 81 and from thence through a radial passage 161 to the main outlet 57.

The water flow connections will now be described: Water enters pipe 6 from a water supply main and flows through pipe 61 and passage 62 to space 55. If cold water tap connection 82 is open, cold water flows from space 55 through passage 158 to radial passage 159 to main outlet 57 and outlet spout 8. If hot water tap connection 81 is open, cold water from space 55 rises through filter 54 and through port 51 into space 60 below piston 47. From space 60, the water flows through Venturi passage 68 to outlet branch 3 (Fig. 3) connected to inlet end of heater pipe coil 2. The water heated therein returns to branch 4 (Fig. 6) and flows through passage 160 and radial passage 161 to main outlet 57 and outlet spout 8. If both hot and cold taps are open, hot water from passage 161 and cold water from passage 159 mix in main outlet 57.

When water flows through venturi 68, it creates a reduced pressure at radial orifices 72 and annular groove 73. This causes a suction in passage 74, causing check valve 76 to close on seat 78. The suction through small bore 77 of valve 76 slowly draws water through passage 80 from the space 48 above piston 47 to open gas valve 13.

The temperature of the outflowing hot water can be reduced by opening bye-pass valve 84 to cause water to flow from space 60 direct to heater pipe coil connection 3 through bye-pass passages 71, 70 without passing through Venturi passage 68.

The gas supply is as follows: Gas main 9 supplies gas through bend 19 to underside of diaphragm 30, around which the gas flows, to pass through port 32 into governor chamber 26. From thence gas flows through passages 36 (Fig. 4) to radial holes 39 and axial hole 40 in main gas valve plug 12. From axial hole 40 it passes into central chamber 41 and to burner 7 when automatic gas valve 13 is open. Main gas valve plug 12 can be turned so that radial holes 39 are out of register with passages 36, in which case no gas can pass to the burner. Gas valve plug 12 is constructed in generally well known manner to supply gas to pilot burner 21 except when the gas valve handle 42 is turned into the fully-off position.

Referring now to Figs. 7–10 and Fig. 12 of the drawings, which illustrate an alternative form of the gas and water sections, the burner 7 is detachably mounted by a coupling nut 90 upon a casing 91 which encloses a horizontally mounted automatic gas valve 92 normally held closed by a spring 93. The casing 91 is superimposed upon a main valve casing 94 which includes a gas inlet 95 and a manually operable main gas valve 96, the barrel 97 of which communicates with the automatic gas valve 92 through a gas volume governor, which in the example shown takes the form of a floating bell 98 lifted by the gas passing through a port 99 from the main gas valve. When the gas lifts the bell 98, the gas passes through an annular space 100 around the bell and through a port 101 above and controlled by the bell, the port 101 opening into a chamber 102 which communicates through a horizontal passage 103 with a chamber 104, the end of which is adapted to be closed by the automatic gas valve 92.

The main gas valve 96 is of the known rotary plug type in which a radial outlet passage 105 in the valve plug registers in the "open" position with the port 99 leading to the gas governor. In order to control the amount to which the port 99 can be uncovered, and thus adjust the valve 96 to local conditions of mains gas pressure and gas calorific value, a circumferential groove 106 may be provided partly around the plug valve 96, one end of this groove being adapted to abut against a tangentially disposed adjustable stud or abutment 107 fitted into the plug barrel 97.

The main valve casing 94 is mounted upon a water section 108 to which it is detachably secured by bolts 109. The water section comprises a main water inlet connection 110 and passageways 84 and 111 leading to the casing 112 of a cold water tap 113 which controls communication between the passageway 111 and a passageway 114 leading to a water outlet 115 to which a swan-neck outlet spout (such as 8 in Figs. 1–4) may be fitted. The water section 108 has branch 117 for connection to the return from a water heating pipe (not shown), which may be similar to the pipe 2 of Fig. 1. The branch 117 communicates by way of passages 118 and 119 with the casing 120 of a hot-water control tap 121 which controls the flow of hot water from the passage 119 to a passageway 122 leading to the water outlet 115. A bye-pass valve 123 in the water section has a radial hole 123a which controls communication between the main water inlet connection 110 and an outlet branch 124 (see Fig. 13) on the casing 125 of the valve 123, the outlet branch 124 being coupled to a bye-pass pipe 126 by means of a coupling nut 137. Detachably mounted at one side of the main valve casing 94 and in axial alignment with the automatic gas valve 92 is a gas valve controlling unit which comprises a piston chamber 127 having a piston 128 movable therein in axial alignment with the stem 129 of the valve 92 and adapted to actuate the latter through a rod 130 movable through a stuffing gland 131. The piston 128 is of the skirted type and the space 132 enclosed by the piston skirt is substantially closed by a diaphragm 133 having a central port 134 through which water can enter the space 132 from a space 135 behind the diaphragm 133, said space 135 communicating with a water passage 136 in the lower wall of piston chamber 127. Water from the main inlet 110 after flowing through passageway 84, in addition to flowing through passageway 111 to tap 113 also passes upwards through an outlet branch 155 which is coupled by a coupling nut 154 to a pipe 138 which opens into the water passage 136. The back of the space 135 behind the diaphragm 133 is closed by a cover 139 for the end of the piston chamber. The central port 134 in the diaphragm 133 is controlled by a throttle valve or governor valve 140 carried by a stem 141 which passes through the diaphragm 133 and is secured to the piston 128. A bent plate spring 142 makes contact with the end cover 139, diaphragm 133 and valve 140 to hold the diaphragm 133 in position. Above the piston chamber 127 is a Venturi tube 143 which forms part of casting 127. The end 144 of the Venturi tube communicates with the space 132 behind the piston 128 by way of a passage 156 sealed at its outer end by plug 153, and the other end of the Venturi tube communicates with branch 145 for connection to the inlet end of the water heating pipe. When the hot water tap 121 is opened, hot water enters the tap at 117 from the heating pipe not shown and passes to water outlet 115 through passages 119 and 122. Cold water entering the apparatus at 110, flows through passage 84 and pipe 138 into passageway 136 and through an annular port 146 into the space 135 behind diaphragm 133, thence through port 134 controlled by governor valve 140 into space 132 behind piston 128. From thence it flows through passage 156 into one end of the Venturi tube 143, flowing therethrough into branch 145 connected to the inlet end of the water heating pipe. The bye-pass water tap 123 provides a direct flow of water from the water inlet connection 110 through bye-pass pipe 126 to the branch 145 leading to the water heating pipe, so that water may pass to the heating pipe without passing through the piston chamber, thus enabling the outflow temperature of the water to be regulated.

In order to establish a difference of pressure on opposite sides of the piston 128 when the hot water tap 121 is opened and water commences to flow through the water heating pipe, a space 147 in front of the piston communicates through an orifice 132a with the space 132 behind the piston at the throat of the Venturi tube 143 through a transfer passage 148 which is controlled by an automatic check valve 149 arranged to retard the flow of water to the Venturi tube from the space 147 and to accelerate the flow in the reverse direction. The purpose of this check valve is to check the outward movement of the piston 128 and consequently retard the opening of the automatic gas valve 92 when the water is turned on at the hot water tap. Conversely, when the hot water tap is turned on, it is desirable that the spring-closed automatic gas valve 92 should close rapidly and this is permitted by reason of the fact that the automatic check valve 149 permits a rapid return flow of water from the space 147 in front of the piston to the space 132 behind the piston. The automatic check valve 149 is in the form of a hollow plug valve which is an easy fit in the transfer passage 148 and is externally grooved to allow water to flow freely around it. The bore of the valve 149 is small and the end of the valve is tapered as shown to seat on a valve seat 150 in the transfer passage 148. When the hot water tap is turned on, the water flow through the Venturi tube 143 causes a reduction of pressure in the tranfer passage 148, so that the check valve 149 is seated and water can only flow through the bore of the check valve from the space 147 in front of the piston, thus retarding outward movement of the piston 128 and opening of the automatic gas valve 92 which regulates the supply to the burner. When the hot water tap is turned off, the pressure of the closing spring 93 on the automatic gas valve 92 returns the piston 128 in its chamber and the rush of water from the space 132 behind the piston forces the automatic check valve 149 off its seat, thus allowing the water to flow rapidly to the space 147 in front of the piston. An abutment screw 151 limits the travel of the check valve.

When only cold water is required, the cold water tap 113 is opened, water flowing then directly from the main water inlet connection 110 through passages 84, 111 and 114 to the water outlet 115 without passing through the water heating pipe.

When hot water is required, the hot water tap 121 is opened, whereupon the water already in the water heating pipe escapes through the water outlet 115 and fresh water enters the water heating pipe by way of the piston chamber 132 and Venturi tube 143 as already described.

If the outflow temperature of the water is to be reduced, the bye-pass water valve 123 can be opened to supply water direct to the water heating pipe without passing through the piston chamber or gas valve controlling unit, (as already described), the volume of water passed by the bye-pass valve being regulated according to the desired effluent temperature.

As the gas valves 92 and 96 are horizontally mounted in the gas valve body, they are readily accessible for inspection or cleaning without necessitating removal of the gas burner.

It is to be understood that my invention is not limited to the details of construction hereinbefore described with reference to the accompanying drawings, inasmuch as subordinate details of the construction are capable of modification or variation within the scope of the invention defined in the appended claims. For example, the piston 47 or 128 may be replaced by a flexible diaphragm or other pressure-responsive member.

I claim:

1. Water heating apparatus comprising a water chamber, a cold water inlet to said chamber, a water outlet passage leading out from said chamber, a rotary plug valve in said outlet passage, a Venturi passage formed axially in said plug valve, a housing for said valve, an outlet port in said housing, said outlet port communicating with one end of said Venturi passage, a water heating pipe system connected at one end to said outlet port, a discharge passage leading from the other end of said pipe system, a water tap in said discharge passage, a pressure-responsive member in said chamber, the space behind said member being open to the cold water inlet and to said Venturi passage, a bye-pass passage connecting the space behind said member with a recess in said plug valve, said recess establishing communication in one position of said valve with the outlet port in said housing, a water passage connecting the throat of the Venturi passage with the water chamber space in front of said member, a gas burner arranged to heat said pipe system, a self-closing valve adapted to regulate the gas supply to said burner, and operative means between said member and said self-closing valve for opening the latter by displacement of said member under reduction of the water pressure in the space in front of said member.

2. Gas-fired water heating apparatus including a water heating pipe system, a gas burner arranged to heat said system, a self-closing gas valve for regulating the burner, a differential pressure chamber, a pressure-responsive member movable in said chamber and arranged to control said gas valve, said member separating said chamber into primary and secondary compartments, a cold water inlet connection to the primary compartment, a rotary valve housing, a rotary valve in said housing, said valve having a double conical passage therein communicating at one end with said primary compartment and at its other end with the heating pipe system, a bye-pass passage between said valve and valve housing, the flow through said bye-pass passage being controlled by angular adjustment of said valve, and a transfer passage connecting the neck of said double conical passage to said secondary compartment.

3. Apparatus according to claim 2 having means for manually effecting angular adjustment of the rotary valve.

4. Apparatus according to claim 2 wherein the rotary valve is a hollow plug having the double conical passage formed axially therein.

5. Apparatus according to claim 2 wherein the rotary valve is of the plug type having the double conical passage formed axially therein, said valve having a recess in the side thereof which communicates with an outlet to the heating pipe system, and the bye-pass passage communicating with an inlet port in the valve housing, said inlet port opening into said recess on corresponding adjustment of said valve.

ALEXANDER PEET.

REFERENCES CITED

The following references are of record in the file of this patent:

UNITED STATES PATENTS

| Number | Name | Date |
|---|---|---|
| 681,018 | Crocker | Aug. 20, 1901 |
| 799,670 | Reynolds | Sept. 19, 1905 |
| 1,114,877 | Goreau | Oct. 27, 1914 |

(Other references on following page)

UNITED STATES PATENTS

| Number | Name | Date |
|---|---|---|
| 1,141,247 | Hudler | June 1, 1915 |
| 1,528,038 | Walker | Mar. 3, 1925 |
| 1,594,726 | Harrison | Aug. 3, 1926 |
| 2,034,123 | Treiber | Mar. 17, 1936 |
| 2,060,452 | Sterick | Nov. 10, 1936 |
| 2,258,590 | Merten | Oct. 14, 1941 |
| 2,274,017 | Weber | Feb. 24, 1942 |

FOREIGN PATENTS

| Number | Country | Date |
|---|---|---|
| 36,831 | Netherlands | Nov. 15, 1935 |
| 190,367 | Switzerland | July 1, 1937 |
| 216,299 | Switzerland | Dec. 1, 1941 |
| 436,779 | Great Britain | Oct. 17, 1935 |
| 448,316 | Great Britain | June 5, 1936 |